Sept. 20, 1927.  W. J. J. MILEY  1,643,167

ANTISKID DEVICE

Filed Feb. 10, 1927

INVENTOR
WILLIAM J. J. MILEY
BY Manuel C. Rosa
ATTORNEY

Patented Sept. 20, 1927.

1,643,167

UNITED STATES PATENT OFFICE.

WILLIAM J. J. MILEY, OF PROVIDENCE, RHODE ISLAND.

ANTISKID DEVICE.

Application filed February 10, 1927. Serial No. 167,276.

The anti-skid devices now commonly used is the conventional tire-chain which comprises parallel chains with transverse spans that envelop the circumferential surface of the tire. Among the disadvantages of this tire chain, are sagging of the chain and the danger of the tire chain becoming caught in the brake-drum or on the axle with the possible breaking of either, and these disadvantages are avoided by my improved anti-skid device.

An object of my invention is to provide an anti-skid device which combines the feature of a chain anti-skid surface and a chain spreader.

Another object of my invention is to provide an anti-skid device which is easily applied and wherein the number of chain spans may be varied at will.

A further object of my invention is to provide an anti-skid device simple in structure and reliable in operation wherein the internal structure to which the chain spans are secured may remain on the wheel all season long.

A still further object of my invention is to provide an anti-skid device wherein chain spans are held in place on the tire tread by clamp arms which in turn are urged against the inner face of the wheel felly by turnbuckle means.

Other advantages and objects will become apparent from the following detailed description taken in connection with the accompanying drawing.

I attain these objects by means of the mechanism illustrated in the drawings wherein—

Figure 1:
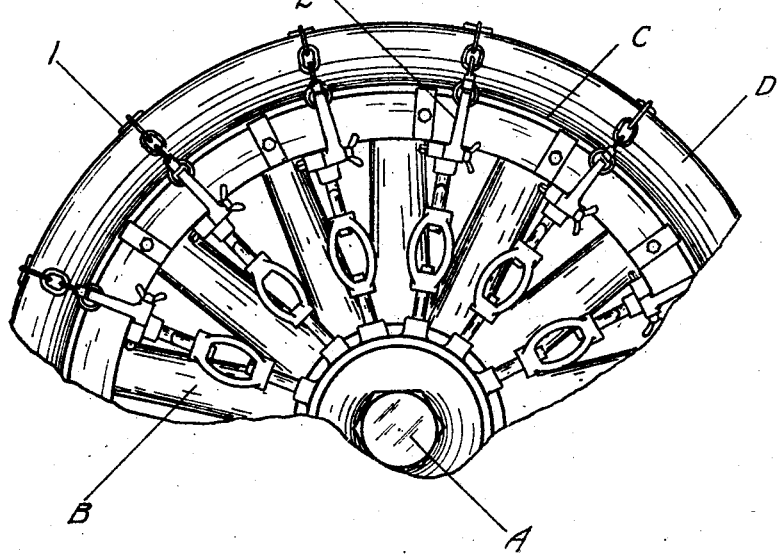
Figure 1 is a side elevational view of the upper portion of an automobile wheel showing my anti-skid device in place.

Referring to Figure 1 of the drawing, the conventional artillery type of automobile wheel is shown with hub A, spokes B, rim C and tire D.

Figure 3:
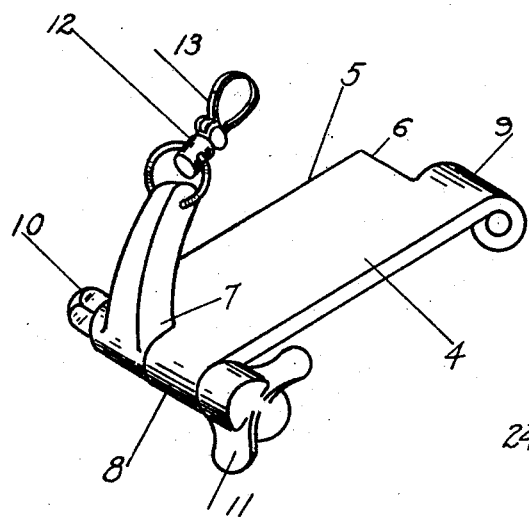
Figure 3 is a view in perspective of the clamping member which is positioned along the inner face of the wheel felly and to which the chain spans are secured.
Figure 2:
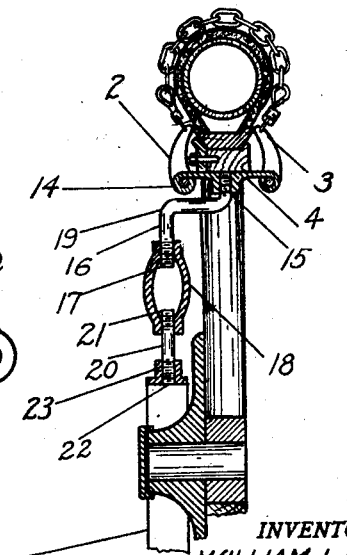
Figure 2 is a vertical cross-sectional view.

The anti-skid chain spans 1 are transversely disposed in spaced relation on the tire tread and are secured to the arms 2, 3 of the clamping member 4. The clamping member (as shown in Fig. 3) comprises a pressed-steel base plate 5 with halved ends, 6, 7, the protruding portions 8, 9, of the base plate being rolled to form loops. The arms 2, 3, each have a hole at one end of a diameter corresponding to the loops on the base plate and the arms are held in hinged relation with the base plate by means of the bolt 10 which is provided with a wing nut 11 to allow of adjustment of the arms and their subsequent tightening into rigid position. By this adjustability feature, it will be appreciated that the clamping arms may be accommodated to varying sizes of rims. The length of the arms may be varied but in no case should the length be such as to interfere with the side walls of the tire shoe. The outer ends of the arms 2, 3, are each provided with a swivel hook 12. The hook 12 is preferably of such a type that it may be operated by hand and at the same time provide the secure holding grip that is necessary. As shown, it is a hook having a spring actuated tongue 13 which is pressed inwardly to insert the end link of the chain span and the latter cannot be released save by pressing inwardly the spring-tongue. In this way it is possible for a person to easily apply the chain spans as well as to replace broken ones. This fastening means is suggestive and it is to be understood that other suitable fastening means may be used.

The clamping members are held in position along the inner face of the wheel felly by the mechanism now to be described. On the inner face of each base plate 5, a threaded socket 14 is provided which receives the outer threaded end 15 of the angle rod 16. The inner threaded end 17 is screwed into one end of the turnbuckle 18. The angle bend 19 serves a purpose to be hereinafter stated. Another rod 20 is screwed into the other end of the turnbuckle at its outer end 21 and the inner end 22 is received into sockets 23 which are disposed along the circumferential surface of the collar member 24. The number of the sockets may be varied, but it is recommended that a large number be provided in order that the use of varying numbers of turnbuckle arms may be made possible. By reason of the offset afforded by the angle rod 16 the collar member does not touch the hub or spokes. The collar 24 is centered by reason of the opposing compressive forces exerted by the aligned turnbuckle arms on each side of the collar member.

The manner and use of the improved antiskid device just described is as follows. The turnbuckle mechanism is shortened and the clamping arms are loosened. Any two diametrically opposed base plates are tightened into engagement with the inner face of the rim or felloe, care being taken that the collar member is centered at the same time. Then two other diametrically opposed base-plates are pressed against the rim by movement of the turnbuckle on the arms and it is suggested that the arms at right-angles to the first arms lengthened should be selected. When all the arms are lengthened and the base plates at their ends pressed against the rim, the collar member should be concentric with the wheel. The clamping arms are raised into contacting position with the rim and then are tightened. The chain spans are next affixed to the swivel hooks provided on the clamping arms for this purpose and the anti-skid device is ready for use. It will be seen that with this organization no separate tire chain spreader is necessary nor is there any circumferential chains to sag loose and become caught on the brake drum or on the axle.

In good weather when the chains are not needed, it is not necessary to dismount the internal structure. All that is necessary is to remove the chain spans, the internal structure consisting of the clamping members, rods, turnbuckle and collars remaining on the wheel all season long if desired. The number of chain spans used may be varied at will as well as the number of turnbuckle arms. The facility with which the chains are added, removed or changed is a highly advantageous feature of my proposed improvement.

The material of which the parts may be made is a matter of discretion although it is suggested that nickle plated parts would prove ornamental as well as durable; however, it should be understood that I contemplate the use of any suitable material.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure which utilize the principle of my invention and fall within the pur-view of my invention and are within the spirit and scope of the following claims.

The invention having been set forth, what I claim as new and useful is as follows:

1. In an anti-skid device for automobile wheels or the like, means for securing anti-skid members in operative position on a tire, said means comprising a plate member adapted to be disposed on the inner face of the wheel felly, said plate member having ear portions offset from the ends thereof, arm members hingedly secured to said offset ear portions, said arm members being provided at their free ends with securing means for the reception of a detachable anti-skid member.

2. An anti-skid device for automobile wheels or the like comprising in combination, spaced plate members transversely disposed along the inner face of the wheel felly, means on each side of said plate members adapted for holding anti-skid means, and radially extensible means for pressing said plate members against the wheel felly, said radially extensible means comprising a series of rods secured to said plate members, a centrally disposed collar member, a second series of rods attached to the exterior surface of said collar member, said second series of rods being radially complementary to the first mentioned series, and turnbuckle means applied to the opposing threaded ends of complementary rods.

3. An anti-skid device for automobile wheels or the like comprising in combination, spaced plate members transversely disposed along the inner face of the wheel felly, means on each side of said plate members adapted for holding anti-skid means, radially extensible means for pressing said plate members against the wheel felly, said radially extensible means comprising a series of rods secured to said plate members, a centrally disposed collar member, a second series of rods attached to the exterior surface of said collar member, said second series of rods being radially complementary to the first mentioned series, and turnbuckle means applied to the opposing threaded ends of said complementary rods, said first mentioned series of rods having an offset portion.

Signed at Fall River in the county of Bristol, State of Massachusetts, this second day of February, 1927.

WILLIAM J. J. MILEY.